(12) United States Patent
Zeira

(10) Patent No.: US 7,003,019 B2
(45) Date of Patent: Feb. 21, 2006

(54) DATA DETECTION FOR CODES WITH NON-UNIFORM SPREADING FACTORS

(75) Inventor: Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 285 days.

(21) Appl. No.: 10/154,108

(22) Filed: May 22, 2002

(65) Prior Publication Data

US 2003/0219065 A1 Nov. 27, 2003

(51) Int. Cl.
*H04B 1/69* (2006.01)
*H04B 1/707* (2006.01)
*H04B 1/713* (2006.01)

(52) U.S. Cl. .................................. 375/147; 375/130
(58) Field of Classification Search ................ 375/130, 375/148, 150, 295, 147; 370/208; 455/453; 700/1
See application file for complete search history.

(56) References Cited

U.S. PATENT DOCUMENTS

| 6,259,721 B1 | 7/2001 | Uesugi et al. | |
| 2002/0110140 A1 | 8/2002 | Juntti et al. | |
| 2003/0026350 A1 * | 2/2003 | Lim et al. | 375/295 |

FOREIGN PATENT DOCUMENTS

| GB | 2359966 | | 5/2001 |
| GB | 2359966 A | * | 5/2001 |

OTHER PUBLICATIONS

Klein et al., Zero Forcing and Minimum Mean-Square-Error Equalization for Multiuser Detection In Code-Division Multiple-Access Channels, IEEE Transactions on Vehicular Technology, US, IEEE Inc. New York, vol. 45, No. 2, May 1, 1996, pps.. 276-287.

H.R. Karimi et al., "A Novel and Efficient Solution to Block-Based Joint-Detection Using Appropriate Cholesky Factorization," IEEE International Symposium on Personal, Indoor and Mobile Radio Communications, vol. 3, 1998, pps. 1340-1345.

J. Mayer et al., "Realtime Feasibility of Joint Detection CDMA," EPMCC, European Personal Mobile Communications Conference Together with Kommunikation, vol. 145, No. 145, 1997, pps 245-25.

* cited by examiner

*Primary Examiner*—Stephen Chin
*Assistant Examiner*—Curtis Odom
(74) *Attorney, Agent, or Firm*—Volpe and Koenig, P.C.

(57) ABSTRACT

One aspect of the invention simultaneously estimates data transmitted in a spread spectrum communication system using different spreading factors. A plurality of communication signals are received. Each communication signal has an associated code. At least two of the communication signals has a different spreading factor. The transmitted data is estimated as estimated symbols using codes of a uniform spreading factor. For data transmitted with a spreading factor other than the uniform spreading factor, the estimated symbols of that data is converted to symbols of the code of that data. Another aspect of the invention receives a spread spectrum communication signal having data spread using a plurality of spreading factors. The data of the communication is estimated as estimated symbols using codes of a uniform spreading factor. The estimated symbols are parsed into parcels, where the estimated symbols correspond to data transmitted with a same spreading factor. For parcels not of the uniform spreading factor, the estimated symbols are converted into symbols of the same spreading factor of that parcel.

10 Claims, 6 Drawing Sheets

FIG. 2

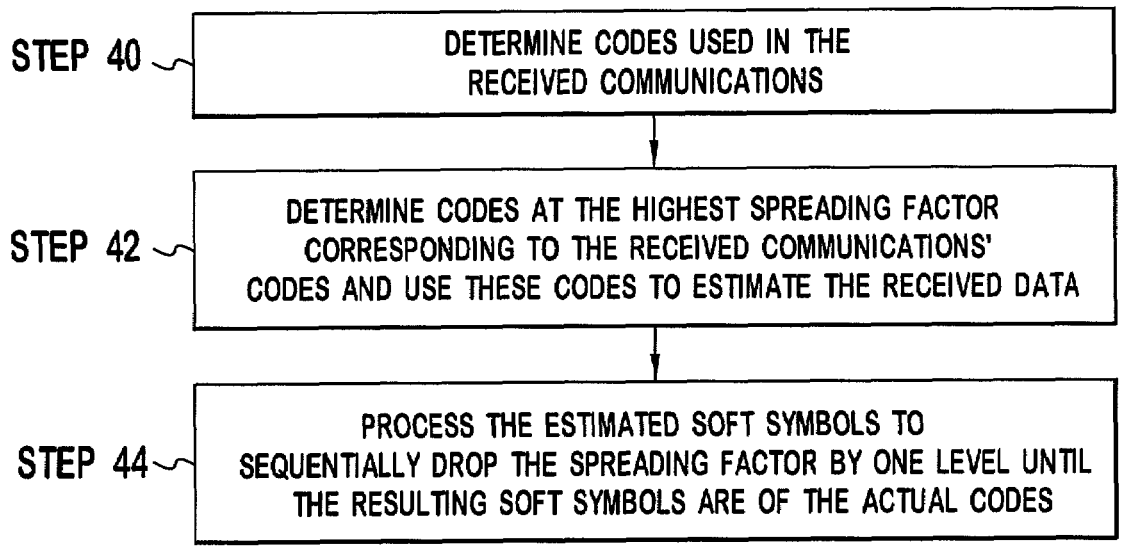

STEP 40 — DETERMINE CODES USED IN THE RECEIVED COMMUNICATIONS

STEP 42 — DETERMINE CODES AT THE HIGHEST SPREADING FACTOR CORRESPONDING TO THE RECEIVED COMMUNICATIONS' CODES AND USE THESE CODES TO ESTIMATE THE RECEIVED DATA

STEP 44 — PROCESS THE ESTIMATED SOFT SYMBOLS TO SEQUENTIALLY DROP THE SPREADING FACTOR BY ONE LEVEL UNTIL THE RESULTING SOFT SYMBOLS ARE OF THE ACTUAL CODES

FIG. 3

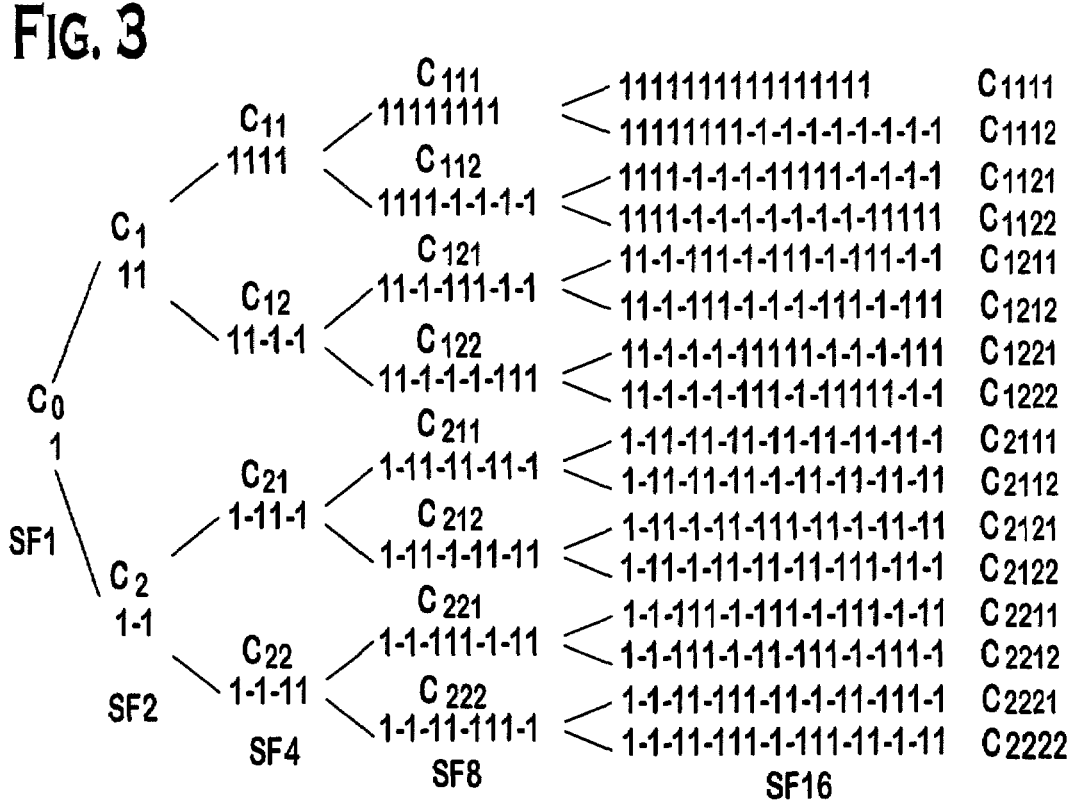

FIG. 4
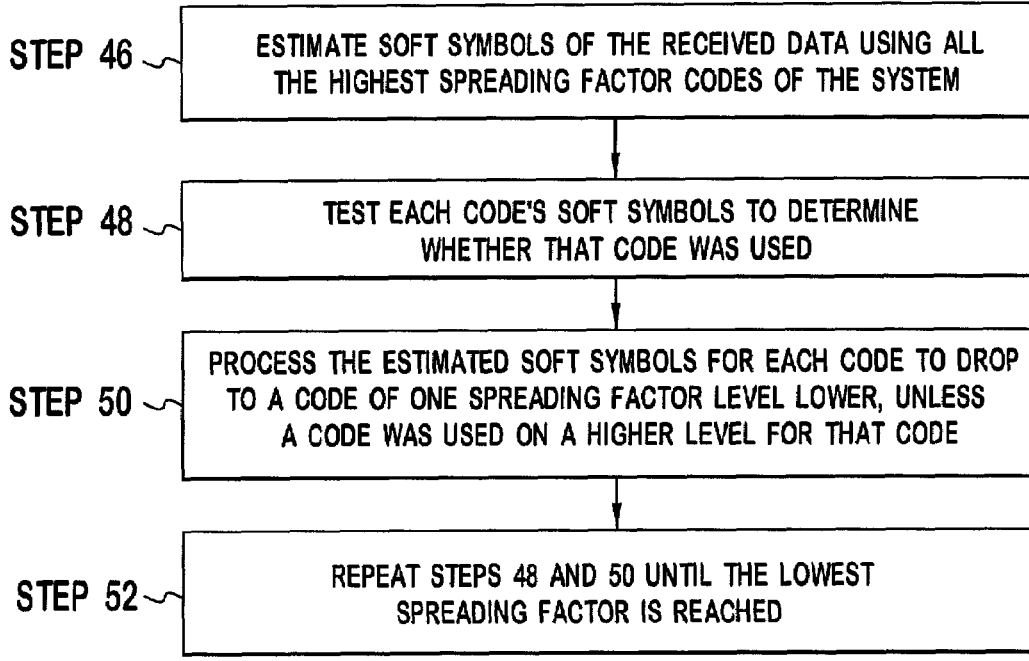
FIG. 5
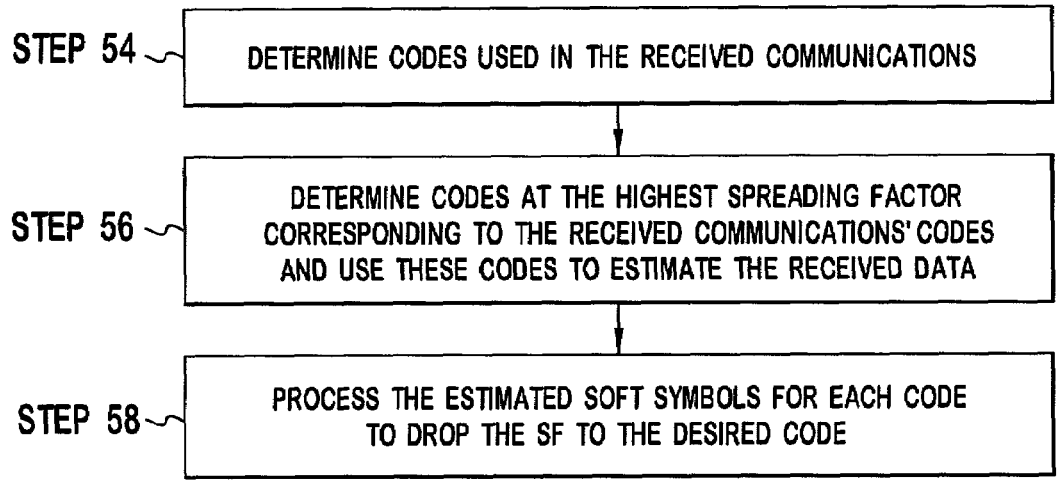
FIG. 6
$C_0$ $C_1$ 11 (XY) $A_1 = X+Y$
1 $C_2$
1 -1 (X-Y) $A_2 = X-Y$
$X = (A_1 + A_2)/2$
$Y = (A_1 - A_2)/2$

FIG. 7
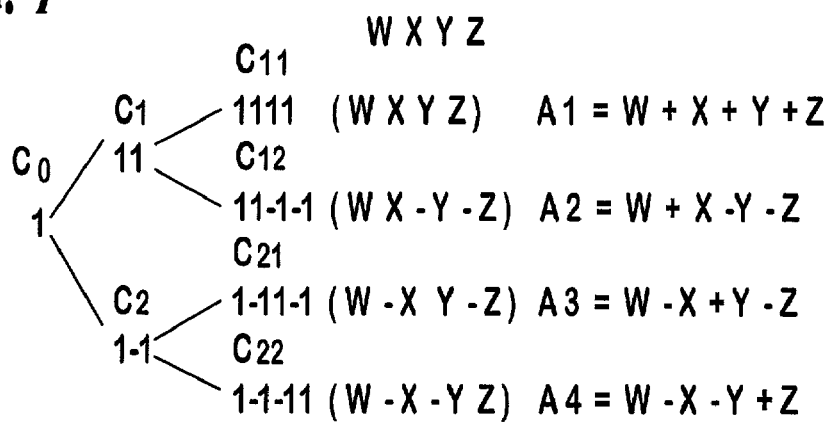
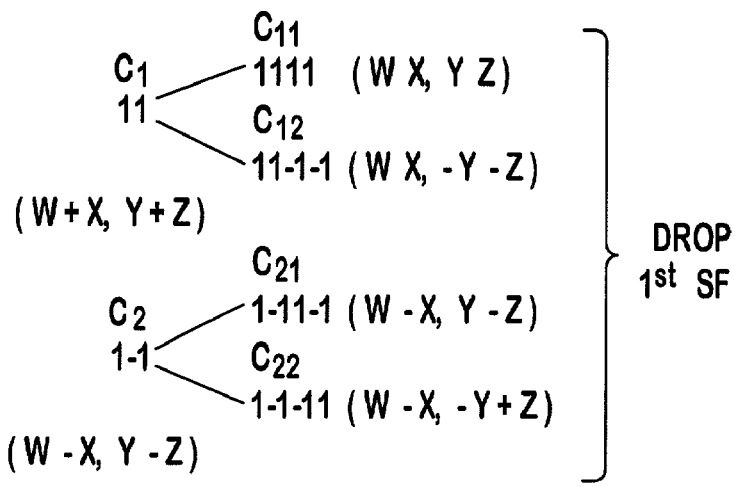
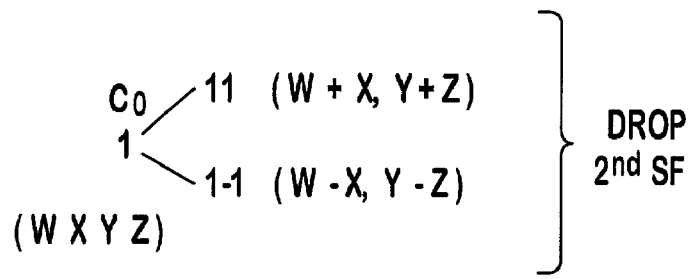
$W = A1 + A2 + A3 + A4$
$X = A1 + A2 - A3 - A4$
$Y = A1 - A2 + A3 - A4$
$Z = A1 - A2 - A3 + A4$
} DIRECTLY SOLVE FOR DESIRED SF

DATA DETECTION FOR CODES WITH NON-UNIFORM SPREADING FACTORS

BACKGROUND

This invention generally relates to wireless code division multiple access communication systems. In particular, the invention relates to data detection of communications having non-uniform spreading factors in such systems.

In code division multiple access (CDMA) communication systems, multiple communications may be simultaneously sent over a shared frequency spectrum. Each communication is distinguished by the code used to transmit the communication. Data symbols of a communication are spread using chips of the code. The number of chips used to transmit a particular symbol is referred to as the spreading factor. One common spreading factor is sixteen (16), where sixteen chips are used to transmit one symbol. Typical spreading factors (SF) are 16, 8, 4, 2 and 1 in TDD/CDMA communication systems.

In some CDMA communication systems to better utilize the shared spectrum, the spectrum is time divided into frames having a predetermined number of time slots, such as fifteen time slots. This type of system is referred to as a hybrid CDMA/time division multiple access (TDMA) communication system. One such system, which restricts uplink communications and downlink communications to particular time slots, is a time division duplex communication (TDD) system.

One approach to receive the multiple communications transmitted within the shared spectrum is joint detection. In joint detection, the data from the multiple communications is determined together. The joint detector uses the, known or determined, codes of the multiple communications and estimates the data of the multiple communications as soft symbols. Some typical implementations for joint detectors use zero forcing block linear equalizers (ZF-BLE), Cholesky or approximate Cholesky decomposition or fast Fourier transforms.

Many of these implementations are designed for all the communications to have the same spreading factor. Simultaneously handling communications having differing spreading factors is a problem for such systems.

Additionally, it may be desirable to use different spreading factors within a same communication. Some symbols of a communication may be sent at a higher quality than other bits within the same communication. To illustrate, some TDD/CDMA systems transmit format combination indicator (TFCI) bits along with other data of the communication burst. It is desirable to transmit these TFCI bits at a higher quality than the payload data. One approach to increase the quality of certain bits and not others is to use different spreading factors. To illustrate, the TFCI bits may be sent with a SF of 16 and the other bits may be sent with a SF of 8, 4, 2 or 1.

Accordingly, it is desirable to be able to handle differing spreading factors in joint detection.

SUMMARY

One aspect of the invention simultaneously estimates data transmitted in a spread spectrum communication system using orthogonal variable spreading factor (OVSF) codes with different spreading factors. A plurality of communication signals are received. Each communication signal has an associated code. At least two of the communication signals has a different spreading factor. The transmitted data is estimated as estimated symbols using codes of a uniform spreading factor. For data transmitted with a spreading factor other than the uniform spreading factor, the estimated symbols of that data is converted to symbols of the code of that data.

Another aspect of the invention receives a spread spectrum communication signal having data spread using a plurality of spreading factors. The data of the communication is estimated as estimated symbols using codes of a uniform spreading factor. The estimated symbols are parsed into parcels, where the estimated symbols correspond to data transmitted with a same spreading factor. For parcels not of the uniform spreading factor, the estimated symbols are converted into symbols of the same spreading factor of that parcel.

BRIEF DESCRIPTION OF THE DRAWING(S)

FIG. 2 is a flow chart of sequentially dropping a spreading factor from a highest spreading factor.

FIG. 3 is an illustration of a tree structure of OVSF codes.

FIG. 4 is a flow chart of sequentially dropping a spreading factor from a highest spreading factor when the transmission codes are unknown.

FIG. 5 is a flow chart of directly dropping a spreading factor from a highest spreading factor.

FIG. 6 is an illustration of dropping a spreading factor by one level.

FIG. 7 is an illustration of dropping a spreading factor by two levels, both sequentially and directly.

DETAILED DESCRIPTION OF THE PREFERRED EMBODIMENT(S)

The embodiments of the invention can generally be used with any type of CDMA system, such as a TDD/CDMA, TDMA/CDMA or frequency division duplex/CDMA communication system, as well as other types of communication systems.

Figure 1:
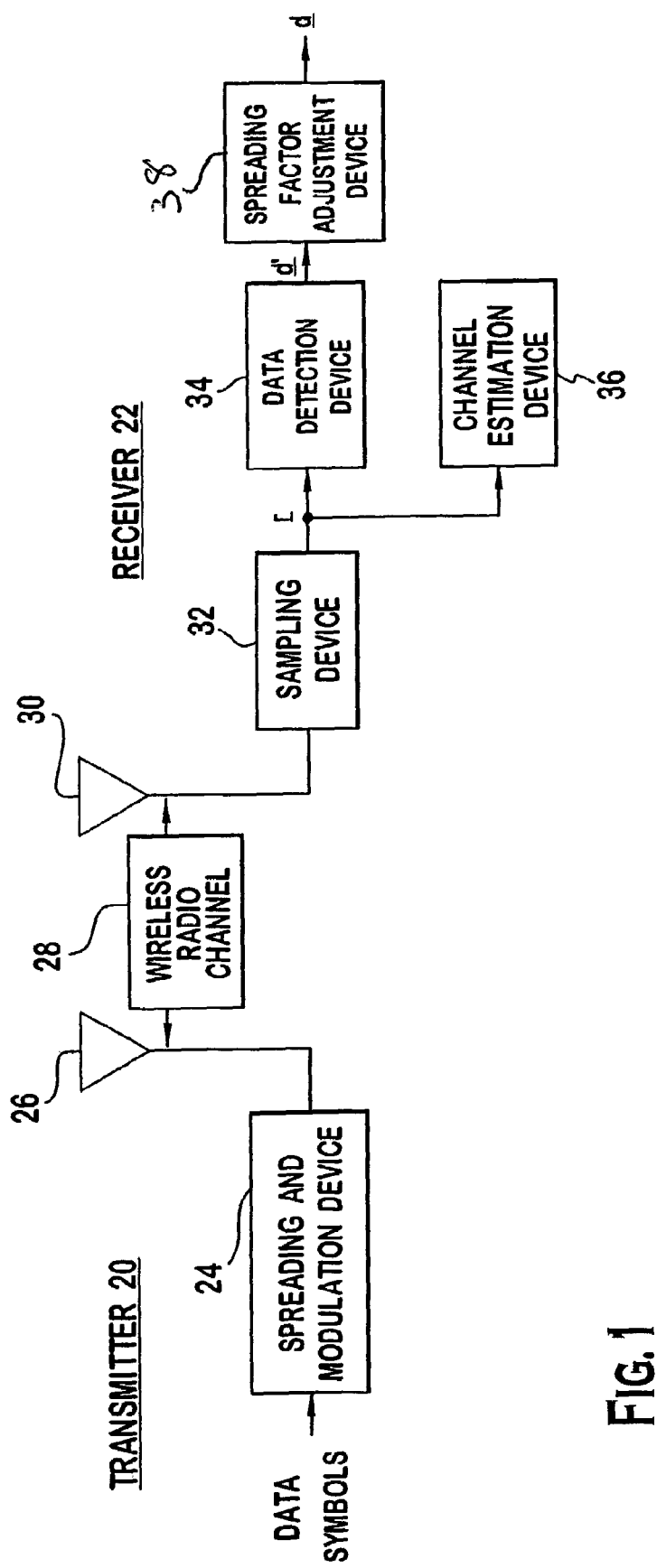
FIG. 1 is an embodiment of a non-uniform spreading factor communication system.

FIG. 1 illustrates an embodiment of a non-uniform spreading factor communication system. A transmitter 20 and a receiver 22 are shown in FIG. 1. The transmitter 20 may be located at a user equipment or multiple transmitting circuits 20 may be located at the base station. The receiver 22 may be located at either the user equipment, base station or both.

Data symbols to be transmitted to the receiver 22 are processed by a modulation and spreading device 24 at the transmitter 20. The spreading and modulation device 24 spreads the data with the codes and at a spreading factor(s) assigned to the communication(s) carrying the data. The communication(s) are radiated by an antenna 26 or antenna array of the transmitter 20 through a wireless radio interface 28.

At the receiver 22, the communication(s), possibly along with other transmitters' communications, are received at an antenna 30 or antenna array of the receiver 22. The received signal is sampled by a sampling device 32, such as at the chip rate or at a multiple of the chip rate, to produce a received vector, r. The received vector is processed by a channel estimation device 36 to estimate the channel impulse responses for the received communications. The channel estimation device 36 may use a training sequence in the received communication, a pilot signal or another technique to estimate the impulse responses. A data detection device 34, such as a joint detection device, uses the code(s) of the received communication(s) and the estimated impulse response(s) to estimate soft symbols, d', of the spread data. The soft symbols, d', are produced assuming that the communication(s) was sent having a homogeneous spreading factor. A spreading factor adjustment device 38 processes the soft symbols to produce soft symbols, d, at the same spreading factor that the data symbols were transmitted.

One approach to detecting the non-uniform SF data is to estimate the soft symbols at a SF that is either the highest SF of the system or a highest SF of the transmitted data. Since the soft symbols are initially estimated assuming a uniform SF, a variety of common data detection implementations may be used, such as a matched filter, ZF-BLEs, joint detectors using Cholesky decomposition or joint detectors using fast Fourier transforms. To illustrate, three communications are transmitted. A first having a SF of 2, a second having a SF of 4 and a third having a SF of 8. For these communications, the data may be estimated assuming a SF of 8. If the maximum SF of any communication in the same system was 16, it may be desirable to use a common design for the data detector 34 to estimate all data assuming a SF of 16.

Two general approaches may be used to take the soft symbols estimated at a highest SF to produce soft symbols at the true SF. The first approach, as shown in FIG. 2, sequentially drops the SF through at least one, but possibly multiple stages. The code used to transmit each communication is determined, step 40. For each code used, all codes at a spreading factor of the highest spreading factor corresponding to the used codes (either the highest used SF or the highest SF of the system) are used to estimate the data in the data detection device 34, step 42. To illustrate, a first communication is transmitted with a SF of 2 and both a second and a third with a SF of 16. FIG. 3 illustrates a code tree of orthogonal codes for spreading factors of 1, 2, 4, 8 and 16. The first communication's code is C1, the second is C2111 and the third is C2222. The data detection device estimates the soft symbols for ten SF 16 codes (C1111 to C1222, C2111 and C2222). Codes C1111 to C1222 correspond to code C1. Alternately, to use a more uniform design regardless of the used codes, all the codes at the highest spreading factor may be used to estimate the data, with the data estimated for the unnecessary codes discarded later.

For each communication or communication portion transmitted at a SF lower than the highest SF, the spreading factor for the soft symbols of these communications or portions are sequentially processed to lower one SF level until the desired SF is reached, step 44. Using the prior example, since the two SF 16 codes, C2111 and C2222, are the actual codes used to transmit the symbols, these codes soft symbols are not lowered in SF. However, the SF 2 communication soft symbols are sequentially dropped from 8 SF 16 codes (C1111 to C1222) to 4 SF 8 codes (C111 to C122) to 2 SF 4 codes (C11 to C12) to 1 SF 2 code (C1).

Dropping the SF one level at a time can be used to recover data, even if the codes used to transmit the data is not known as shown in FIG. 4. All the codes at the highest SF, such as SF 16, are used to estimate the received data, step 46. The estimated soft symbols for each of these codes is tested to see if this code was used to transfer data, step 48. The estimated soft symbols for each of these codes are processed to simulate data estimation at one SF lower in the tree. If a higher SF code is used to carry data, a lower SF code on that branch can not be used to carry data. Accordingly, the lowering of the SFs on those branches is not performed, step 50. This process of testing and lowering the SF level is repeated for each level until the lowest, step 52. As a result, not only are the soft symbols for the used codes determined, but also the used codes as well.

The second approach directly takes the estimated soft symbols for the highest SF factor and converts them to the lowest SF as shown in FIG. 5. To illustrate, the symbols estimated for the eight SF 16 codes (C1111 to C1222) of the prior example are directly combined to produce the symbols for the SF 2 code (C1). The code used to transmit each communication is determined, step 54. For each code used, all codes at a spreading factor of the highest spreading factor corresponding to the used codes (either the highest used SF or the highest SF of the system) are used to estimate the data in the data detection device 34, step 56. Alternately, to use a more uniform design regardless of the used codes, all the codes at the highest spreading factor may be used to estimate the data, with the data estimated for the unnecessary codes discarded later. For each communication or communication portion transmitted at a SF lower than the highest SF, the spreading factor for the soft symbols of these communications or portions are processed to produce soft symbols of the desired code, step 58.

FIG. 6 is an illustration of combining symbols to drop one SF level, such as from SF 16 to SF 8, SF 8 to SF 4, SF 4 to SF 2 or SF 2 to SF 1. A transmitter 20 transmits two data symbols x and y at a particular spreading factor, such as SF 1. For simplicity, say the code used to transmit x and y was C0 for SF 1. The data detection device 34 estimates the soft symbols at a higher SF for two codes on the tree at a next higher spreading factor, say codes C1 and C2 for SF 2. Instead of estimating the correct symbols x and y, the data estimation device 34 estimates two symbols (A1 and A2) at SF 2 as combinations of x and y. A1 is x+y (for C1) and A2 is x−y (for C2). Since A1 and A2 are related to x and y, x and y can be determined from soft symbols A1 and A2. x equals ((A1+A2)/2) and y equals ((A1−A2)/2).

As can be seen in FIG. 3, two branches from any code to the next higher SF code is that code follow by itself and that code followed by the negation of itself. To illustrate, code C12 (1, 1, −1, −1) branches into C121 (C12, C12 or 1, 1, −1, −1, 1, 1, −1, −1) and C122 (C12, −C12 or 1, 1, −1, −1, −1, −1, 1, 1). As a result, the approach illustrated in FIG. 6 can be used to drop down one SF level for any codes in the tree.

By repeating this process, SFs can sequentially be dropped one level at a time. FIG. 7 illustrates dropping two levels. Data is transmitted using SF 1 and initially estimated at SF 4. The transmitted symbols are w, x, y and z. The code used to transmit the data is C0 and the initial estimated symbols correspond to code C11 to C22. The estimated symbol for C11 is actually w+x+y+z, for C12 is w+x−y−z, for C21 is w−x+y−z and for C22 is w−x−y+z. If the SF is dropped in two steps, the symbols are subsequently reduced from SF 4 to SF 2. For code C11, the combining of the symbols as illustrated in FIG. 6 results in two symbols, w+x followed by y+z. For code C22, the combining of symbols also results in two symbols, w−x followed by y−z. Reducing from SF 2 to SF 1, the first symbols are combined producing w followed by x and the second symbols are combined resulting with y followed by z. As a result, the original symbols w, x, y, z are reconstructed. By sequentially repeating this procedure, the SF can be reduced from any SF sequentially down to any other SF.

The second approach to reduce the SF does it directly in one step. For a particular transmission code, the symbols are also estimated for all the codes of the highest SF for all of that code's branches. The highest SF signals are directly combined to produce the symbols at the desired SF. Such an approach is also illustrated in FIG. 7. The data transmitted is w, x, y, z. The estimated soft symbol for code C11 is A1, which equals w+x+y+z; for code C12 is A2, which equals w+x−y−z; for C21 is A3, which equals w−x+y−z; and for code 22 is A4, which equals w−x−y+z. Since there are four equations and four unknowns, w, x, y and z can be determined directly. As shown in FIG. 5, w equals A1+A2+A3+A4; x equals A1+A2−A3−A4; y equals A1−A2+A3−A4; and z equals A1−A2−A3+A4. Similarly, any SF can be reduced to any other SF. To illustrate for a SF 16 being reduced to SF 1, 16 soft symbols are initially estimated. Sixteen equations with sixteen unknowns is solved to estimate the originally transmitted symbols at a SF 1.

Another approach to estimate data for communication(s) having non-uniform spreading factors estimates the soft symbols at a lowest spreading factor and combines the estimated symbols to determine the symbols at the actual transmission spreading factor and code. The lowest spreading factor may be the lowest spreading factor of the system or the lowest spreading factor of symbols of the transmitted communication(s).

Figure 8:
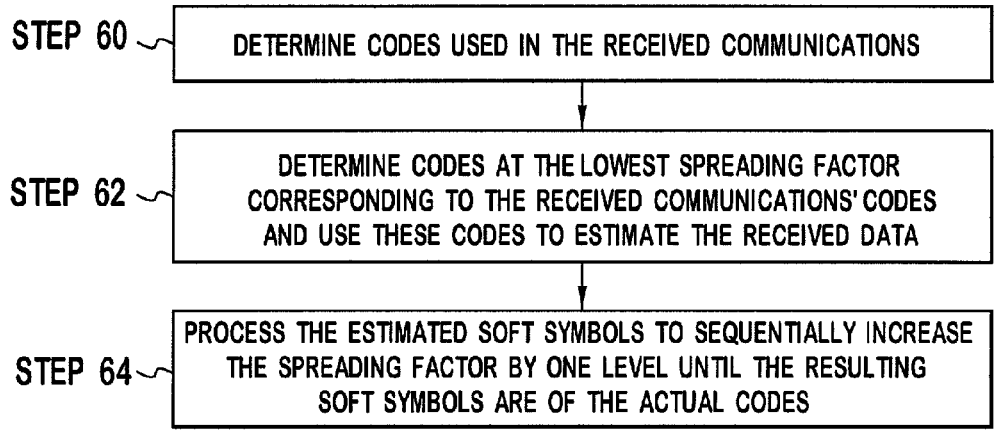
FIG. 8 is a flow chart of sequentially increasing a spreading factor from a lowest spreading factor.

Two general approaches may be used to take the soft symbols estimated at a highest SF to produce soft symbols at the true SF. The first approach as shown in FIG. 8 sequentially increases the SF by at least one, but possibly multiple stages. The code used to transmit each communication is determined, step 60. For each code, all codes at a spreading factor of the lowest spreading factor corresponding to the used codes are used to estimate the data in the data detection device 34, step 62. To illustrate, a first communication is transmitted with a SF of 2, code C1 and both a second and a third with a SF of 16, codes C2111 and C2222. The received signals are spread using two SF 2 codes, codes C1 and C2 (corresponding to C2111 and C2222) Alternately, a code of the lowest SF of the system, such as C0 for SF 1, is used.

For each communication or communication portion transmitted at a SF higher than the lowest SF, the SF for the soft symbols of these communications or portions are sequentially processed to increase one SF level until the desired SF is reached, step 62. Using the prior example, since the SF 2 code, C1, is the actual code used to transmit the symbols, this code's soft symbols are not raised in SF. However, the SF 16 communications' soft symbols are sequentially increased from one SF 2 code (C2) to two SF 4 codes (C21 and C22) to two SF 8 codes (C211 and C222) to the two SF 16 codes (C2111 and C2222).

Figure 9:
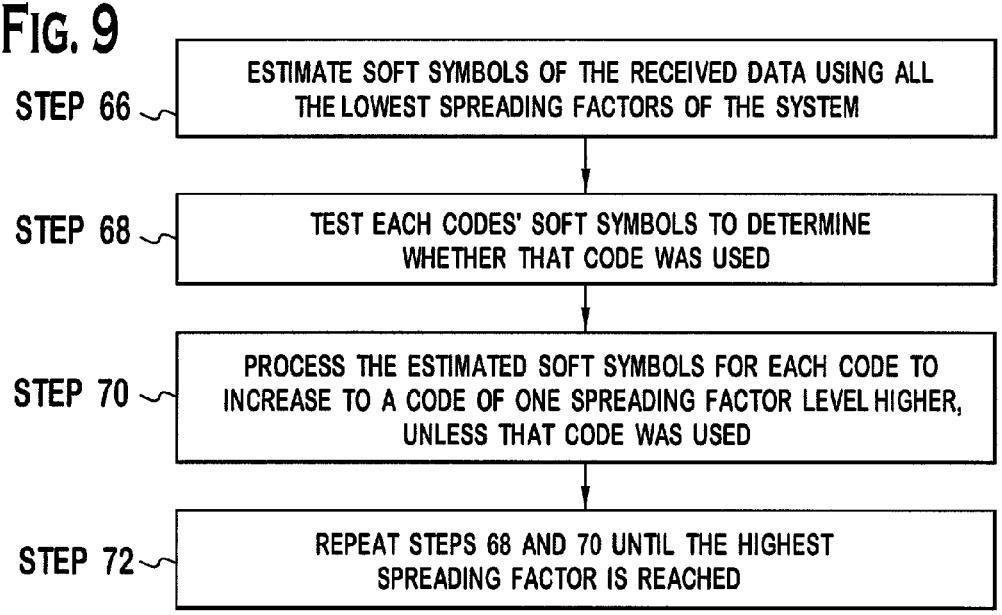
FIG. 9 is a flow chart of sequentially increasing a spreading factor from a lowest spreading factor when the transmission codes are unknown.

Increasing the SF one level at a time can be used to recover data, even if the codes used to transmit the data is not known as shown in FIG. 9. All the codes at the lowest SF, such as SF 1, are used to estimate the received data, step 66. The estimated soft symbols for each of these codes is tested to see if this code was used to transfer data, step 68. The estimated soft symbols for each of these codes are processed to simulate data estimation at one SF higher in the tree. If the SF code was determined as being a used code, a higher SF code on that branch can not be used to carry data. Accordingly, the increasing of the SFs on those branches is not performed, step 70. This process of testing and lowering the SF level is repeated for each level until the highest level, step 72. As a result, not only are the soft symbols for the used codes determined, but also the used codes as well.

Figure 10:
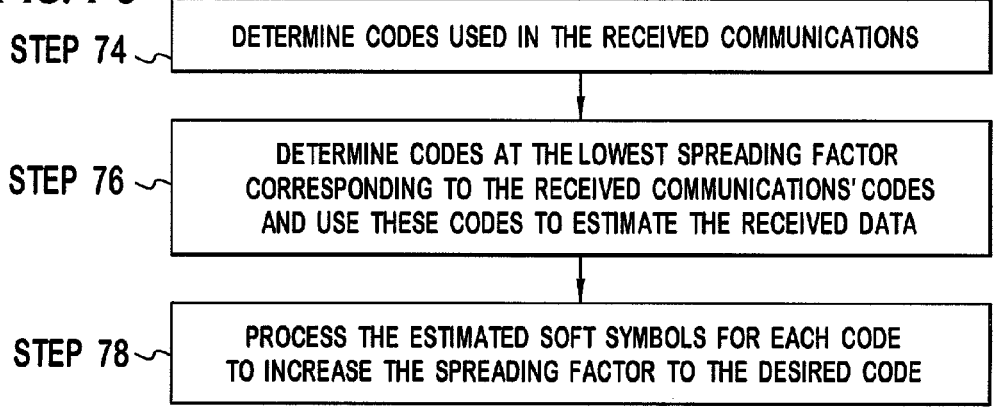
FIG. 10 is a flow chart of directly increasing a spreading factor from a lowest spreading factor.

The second approach takes the estimated soft symbols for the lowest SF and converts them directly to the desired SF codes as shown in FIG. 10. To illustrate, the symbols estimated for C2 are processed to become the symbols for codes C2111 and C2222. The code used to transmit each communication is determined, step 74. For each code used, all codes at a spreading factor of the lowest SF corresponding to the used codes (either the lowest used SF or the lowest SF of the system) are used to estimate the data in the data detection device 34, step 76. Alternately, to use a more uniform design regardless of the used codes, all the codes at the lowest spreading factor may be used to estimate the data, with the data estimated for any unnecessary codes discarded later. For each communication or communication portion transmitted at a SF higher than the lowest SF, the spreading factor for the soft symbols of these communications or portions are processed to produce soft symbols of the desired code, step 78.

Figure 11:
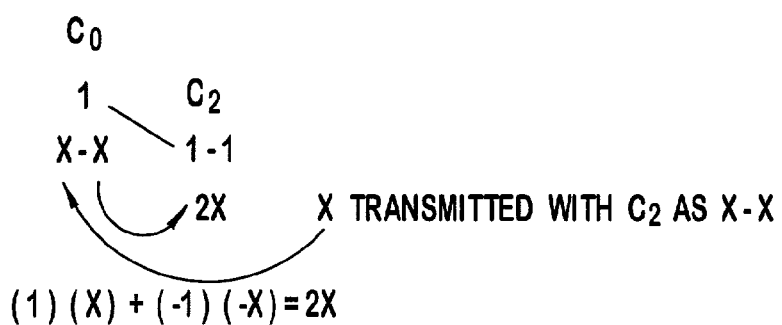
FIG. 11 is an illustration of increasing a spreading factor by one level.

FIG. 11 is an illustration of converting detected symbols to increase one SF level, such as from SF 1 to SF 2, SF 2 to SF 4, SF 4 to SF 8 or SF 8 to SF 16. The example here illustrates detecting data at a SF 1 for code C0 and converting the detected soft symbols to a transmitted code C2. A transmitter transmits a data symbol x at a particular spreading factor, such as SF 2 using code C2 (1 −1). When x is transmitted with code C2, it is transmitted as x −x. Detecting the data with code C0 (1) results in the detected symbols being x −x. The detected soft symbols are converted to C2 resulting in a value of 2x. In this case, the detected data (x −x) can be mixed with the code C2 (1 −1) and combined (x*1+−x*−1) resulting in 2x.

Figure 12:
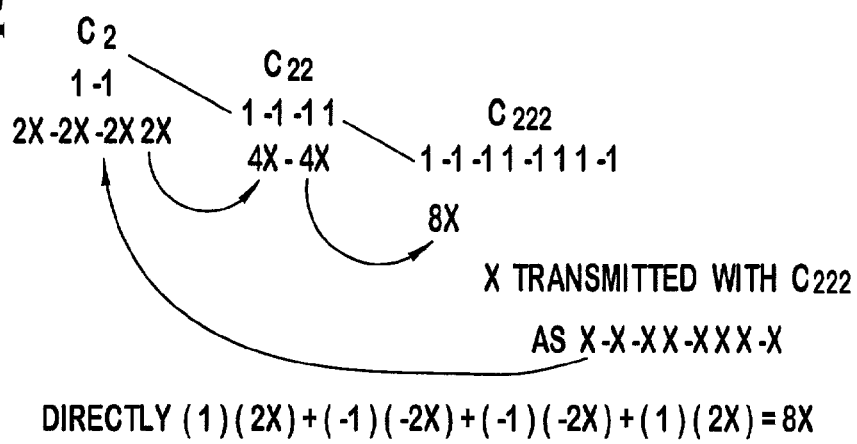
FIG. 12 is an illustration of increasing a spreading factor by two levels, both sequentially and directly.

FIG. 12 is an illustration of converting detected symbols to sequentially increase two SF levels. A symbol x is transmitted using code C222 (1 −1 −1 1 −1 1 1 −1) as x −x −x x −x x x −x. The data is detected at two SF levels lower using code C2 (1 −1). Using code C2, the data is detected as 2x −2x −2x 2x. The detected soft symbols are converted to the next code level up the tree C22. Since C22 is equivalent to C2 −C2 (or C2*(1 −1)), the soft data is converted to code C22 by effectively mixing it with code 1 −1. The resulting soft symbols are 4x −4x. The converted symbols are converted to the next code level up the tree C222 (1 −1 −1 1 −1 1 1 −1). Code C222 is equivalent to code C22 −C22 (or C22*(1 −1)). To convert the soft symbols to code C222, the symbols are effectively mixed by 1 −1. As a result, the resulting soft symbol is 8x (4x−−4x).

The second approach to increase the SF does it directly in one step. For a particular transmission code, the symbols are also estimated for all the codes of the lowest SF code of each codes branches. The estimated symbols are directly combined to produce the symbols at the desired SF.

FIG. 12 illustrates directly increasing the estimated soft symbols two SF levels. Using the previous code example, the data is transmitted using code C222 and the data is detected using code C2. A symbol x is transmitted using code C222 ((1 −1 −1 1 −1 1 1 −1) as x −x −x x −x x x −x. The data is detected at two SF levels lower using code C2

(1 −1). Using code C2, the data is detected as 2x −2x −2x 2x. Code C222 is related to C2 as C2 −C2 −C2 C2 (or C2*(1 −1 −1 1). To convert the soft symbols from code C2 to C222, the symbols are effectively mixed by 1 −1 −1 1. As a result, the resulting soft symbol is 8x (2x−−2x−−2x +2x).

Additionally, a hybrid approach may be used to recover data from communication(s) having non-uniform spreading factor. The communications may be processed at an intermediate spreading factor, such as 8, 4 or 2, and the detected soft symbols are processed to both increase and decrease the SF, such as to both SF 2 and 16.

These approaches for simultaneously detecting data symbols having non-uniform spreading factors can be used to recover data from communications transmitted with different spreading codes and a single communication having symbols spread using a different spreading factor. For communications transmitted using different SFs, the estimated symbols of each communication can be compensated for similarly. For a communication having different spreading factors, the receiver needs to know which symbols were transmitted using which SF. The receiver can parse the received symbols of the communication by the SF of the symbols and compensate for each parcel separately.

Figure 13:
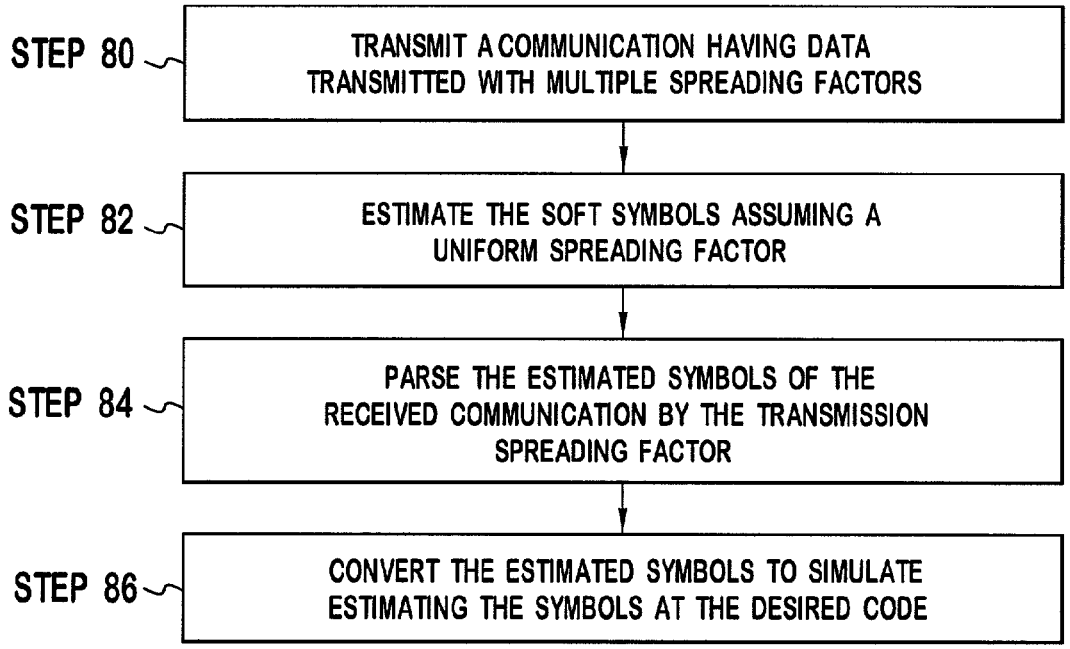
FIG. 13 is a flow chart for recovering data from a communication transmitted using multiple spreading factors.

FIG. 13 shows a flow chart for recovering data from a communication transmitted using multiple SFs. The communication is transmitted having data spread using different SFs, step 80. Soft symbols of the data is estimated assuming a uniform SF for the entire communication, such as the highest SF or the lowest SF, step 82. The estimated symbols are parsed into parcels having the same SFs, step 84. The estimated symbols for each parcel are processed to simulate the estimation of symbols at the desired SF, step 86.

It may be desirable to use differing SFs in a communication to transmit different symbols at a different quality of service. To illustrate, in some TDD/CDMA systems TFCI and power control bits are multiplexed with transmitted payload data. It may be desirable to transmit these bits at a higher quality than the other data. Additionally, using varying spreading factors within a communication allows for services having different quality of services to be more readily multiplexed together in the same communication.

What is claimed is:

1. A method for communicating data in a spread spectrum communication system, the method comprising:
   receiving a communication, the communication having data spread using a plurality of spreading factors;
   estimating data of the communication as estimated symbols using codes of a uniform spreading factor;
   parsing the estimated symbols into parcels where the estimated symbols correspond to data transmitted with a same spreading factor, at least two of the parcels having different spreading factors; and
   for parcels not of the uniform spreading factor, converting the estimated symbols into symbols of the same spreading factor of that parcel.

2. The method of claim 1 wherein one of the parcels comprises a transport format combination indicator bit.

3. A user equipment for communicating data in a spread spectrum communication system, the user equipment comprising:
   an antenna for receiving a communication, the communication having data spread using a plurality of spreading factors;
   a data estimation device for estimating data of the communication as estimated symbols using codes of a uniform spreading factor;
   a spreading factor adjustment device for parsing the estimated symbols into parcels where the estimated symbols correspond to data transmitted with a same spreading factor, at least two of the parcels having different spreading factors, and for parcels not of the uniform spreading factor, for converting the estimated symbols into symbols of the same spreading factor of that parcel.

4. The user equipment of claim 3 wherein one of the parcels comprises a transport format combination indicator bit.

5. A user equipment for communicating data in a spread spectrum communication system, the user equipment comprising:
   means for receiving a communication, the communication having data spread using a plurality of spreading factors;
   means for estimating data of the communication as estimated symbols using codes of a uniform spreading factor;
   means for parsing the estimated symbols into parcels where the estimated symbols correspond to data transmitted with a same spreading factor, at least two of the parcels having different spreading factors; and
   means for parcels not of the uniform spreading factor, for converting the estimated symbols into symbols of the same spreading factor of that parcel.

6. The user equipment of claim 5 wherein one of the parcels comprises a transport format combination indicator bit.

7. A base station for communicating data in a spread spectrum communication system, the base station comprising:
   an antenna for receiving a communication, the communication having data spread using a plurality of spreading factors;
   a data estimation device for estimating data of the communication as estimated symbols using codes of a uniform spreading factor;
   a spreading factor adjustment device for parsing the estimated symbols into parcels where the estimated symbols correspond to data transmitted with a same spreading factor, at least two of the parcels having different spreading factors, and for parcels not of the uniform spreading factor, for converting the estimated symbols into symbols of the same spreading factor of that parcel.

8. The base station of claim 7 wherein one of the parcels comprises a transport format combination indicator bit.

9. A base station for communicating data in a spread spectrum communication system, the base station comprising:
   means for receiving a communication, the communication having data spread using a plurality of spreading factors;
   means for estimating data of the communication as estimated symbols using codes of a uniform spreading factor;
   means for parsing the estimated symbols into parcels where the estimated symbols correspond to data transmitted with a same spreading factor, at least two of the parcels having different spreading factors; and
   means for parcels not of the uniform spreading factor, for converting the estimated symbols into symbols of the same spreading factor of that parcel.

10. The base station of claim 9 wherein one of the parcels comprises a transport format combination indicator bit.

* * * * *